Figure 1:
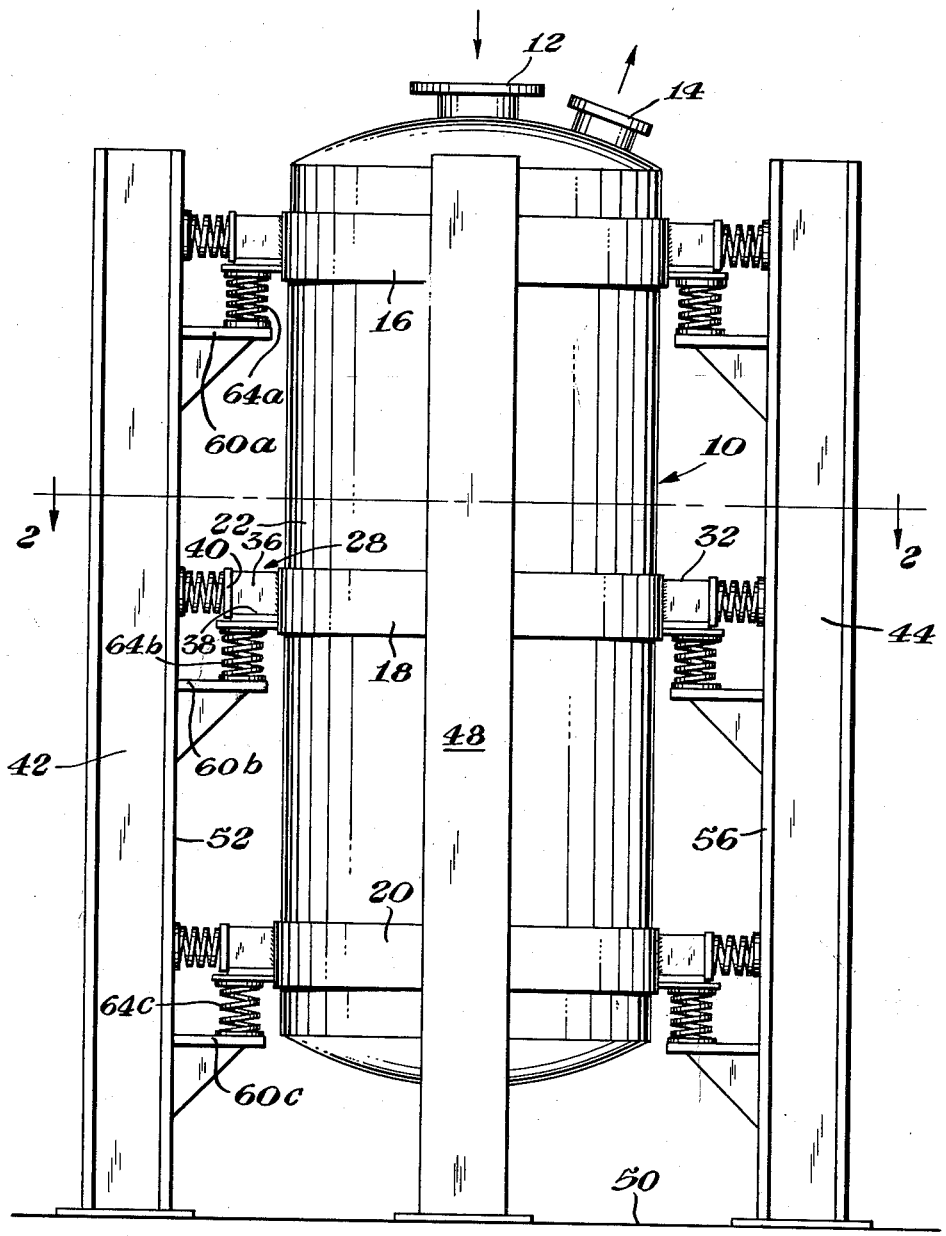

April 21, 1964

L. K. FREVEL 3,129,836

SUPPORTING STRUCTURE FOR REACTOR VESSELS

Filed Feb. 4, 1963

2 Sheets-Sheet 1

INVENTOR.
Ludo K. Frevel
BY Earl D. Ayers
AGENT

April 21, 1964 L. K. FREVEL 3,129,836
SUPPORTING STRUCTURE FOR REACTOR VESSELS
Filed Feb. 4, 1963 2 Sheets-Sheet 2

INVENTOR.
Ludo K. Frevel
BY Earl D. Ayers
AGENT

United States Patent Office 3,129,836
Patented Apr. 21, 1964

3,129,836
SUPPORTING STRUCTURE FOR REACTOR VESSELS
Ludo K. Frevel, Midland, Mich., assignor to The Dow Chemical Company, Midland, Mich., a corporation of Delaware
Filed Feb. 4, 1963, Ser. No. 255,870
7 Claims. (Cl. 220—1)

This invention relates to apparatus for supporting a vessel and particularly to apparatus for supporting a reactor vessel which is subject to varying temperatures during its operation.

Reactor vessels which contain catalyst beds are subject to wide variations in temperature during operation and particularly during the regeneration of the catalyst bed. These temperature variations cause the wall of the reactor to distort slightly during each cycle of temperature variations. Over a period of years the accumulated distortion causes misalignment and/or partial buckling of the reactor. In the past it has been customary to construct such reactor vessels with relatively thick walls which, it is hoped, can withstand the temperature induced stresses.

Constructing the vessels heavier than is otherwise needed, however, is an expensive practice.

Accordingly, a principal object of this invention is to provide an improved means for supporting a hollow vessel which is subjected to thermal stresses.

Another object of this invention is to provide improved means for supporting a hollow elongated reactor vessel which during operation undergoes thermal expansion of its walls.

In accordance with this invention, there is provided an elongated hollow vessel having a plurality of band-like girdles around its walls or shell. The girdles are disposed in parallel spaced apart relationship along the length of the vessel and are secured, as by welding, to the shell. An array of support brackets is coupled to and extends outwardly from each girdle, the brackets being symmetrically disposed around the girdle, the brackets on one girdle being vertically aligned with the brackets on the other girdles.

An array of upright vessel supporting members is disposed around the vessel, each of the members being generally aligned with one of the brackets which are coupled to the girdles. An array of support shelves is secured to each of the supporting members, each of the arrays being similar in number of shelves and their disposition along the supporting members. Springs, usually coil type, extending between each of the support brackets on the girdle and one of the brackets on one of the supporting members, actually support the vessel in its operating position.

Figure 2:
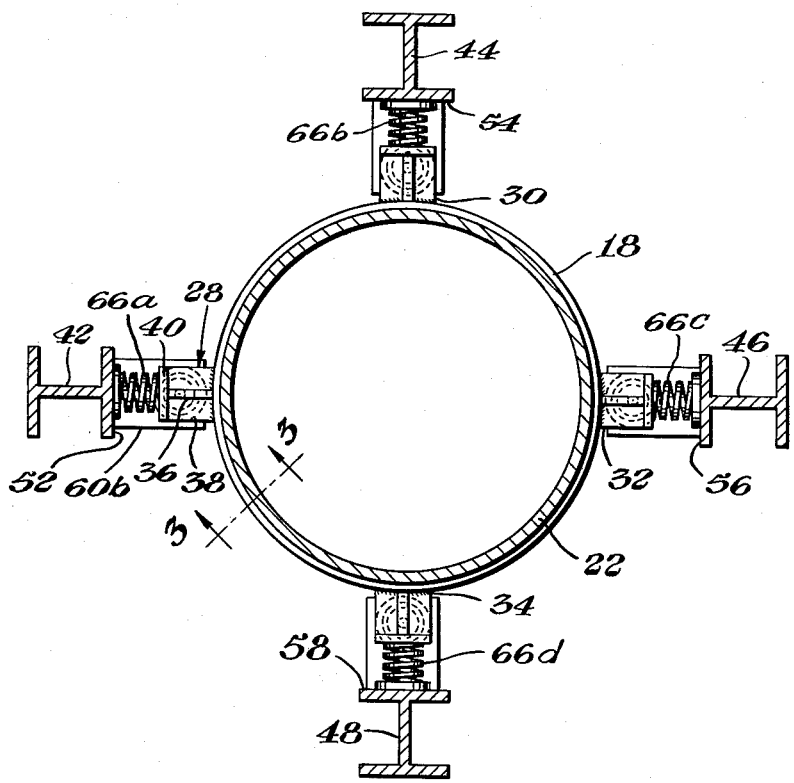
Figure 3:
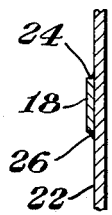
Figure 4:
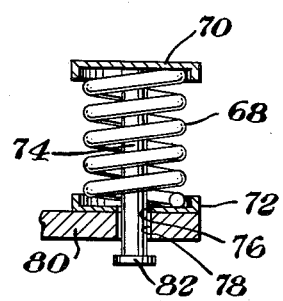

The invention, as well as additional objects and advantages thereof, will best be understood when the following description is read in connection with the accompanying drawing, in which:

FIG. 1 is a side elevational view of vessel supporting apparatus in accordance with this invention;
FIG. 2 is a plan view of the apparatus shown in FIG. 1;
FIG. 3 is a fragmentary sectional view taken along the line 3—3 of FIG. 2; and
FIG. 4 is a side elevational view partly in section of an alternative spring assembly adapted for use in this invention.

Referring to the drawing, and particularly to FIGS. 1 and 2, there is shown an elongated hollow reactor vessel, indicated generally by the numeral 10, which has an inlet coupling 12 and an outlet coupling 14 at or near its upper end. A plurality of close fitting encircling bands or girdles 16, 18, 20 are secured to the outer surface of the vessel's wall 22 (see FIG. 3, especially) by means of welds 24, 26. An array of supporting brackets (28, 30, 32, 34 on the band 18, for example, as shown in FIG. 2) are secured, as by welding, for example, to each of the bands or girdles 16, 18, 20. The brackets (28, for example) comprise a plate-like element 36 which extends radially outwardly from the girdle 18, a bottom plate 38, and an end plate 40. The bottom plate 38 is approximately square and extends from the wall 22 (to which it is welded) to the outer end of the element 36. The bottom plate 38 has approximately an equal amount of area on each side of the element 36, two of the edges of the bottom plate 38 being approximately parallel to the element 36. The end plate 40 is secured, as by welding, in line contact with the outer end of the element 36 and is perpendicular thereto. The bottom edge of the end plate 40 is aligned with and welded to the outward edge of the bottom plate 38.

An array of supporting columns 42, 44, 46, 48, symmetrically disposed around the vessel 10, are each secured at its lower end to a suitable base such as a concrete slab 50. The columns 42, 44, 46, 48 have an H-shaped transverse cross sectional configuration, as may be seen in FIG. 2. Each of the columns has one of its flanged parts (52, 54, 56, or 58) facing towards the vessel (the web of the column being on a line which, if extended, would pass through the longitudinal axis of the vessel). An array of supporting shelves is secured to the flanged part 52, 54, 56, or 58 of each column. For example, shelves 60a, 60b, and 60c extend from the column 42 and are spaced apart by approximately the same vertical distance as separates the girdles 16, 18, 20 from one another. Each of the shelves extends towards the vessel 10 and, when the vessel 10 is in its operative position, the shelves each extend under and are aligned with one of the brackets (28, 30, 32 or 34, for example). The shelves each are supported from below by a brace 62a, 62b, or 62c, for example.

A coil spring (64a, 64b, 64c, for example) is axially vertically disposed between each shelf (60a, 60b, or 60c) and each bottom plate 38 of the brackets on the vessel 10. The coil springs (64a, etc.) are preferably sufficiently firm to collectively support the weight of the loaded reactor without completely compressing to the point where adjacent coils of the springs contact each other.

A second array of coil springs, 66a, 66b, 66c, 66d, for example (see FIG. 2), is compressed between the end plate 40 of each bracket 28 and the column flange (52, 54, 56, or 58) facing the vessel.

FIG. 4 illustrates an alternative manner of disposing a coil spring between two flat surfaces. A coil spring 68 has a shallow cup-shaped element 70, 72 at its ends. The element 70 has a rod 74 secured thereto which extends axially through the spring 68 and through bores 76 and 78 in the element 72 and plate 80, respectively. The rod 74 has an upset end 82 which prevents the end of the rod from passing through the bore 78, 80.

In operation, the vessel is supported by the columns 42, 44, 46, 48 through the shelves, springs, brackets, and girdles as described above. While the vertically axially aligned springs (of which 64a, 64b, and 64c shown in FIG. 1 are examples) support the vertical load of the reactor vessel, the horizontally aligned springs help prevent any side sway or lateral movement which, over a long period of time, would tend to make the vessel out of alignment with its vertical support elements.

With the type of suspension utilized in this invention expanding or contracting of the vessel at either a uniform or non-uniform rate will have little opportunity to buckle the reactor shell because the shell is independently supported at each spring location.

While four supporting columns have been illustrated, three columns, spaced about 120 degrees apart, will be adequate to support many vessels. Likewise, while three girdles have been illustrated in connection with the vessel 10, a greater number of girdles may be used as required for a particular application.

What is claimed is:

1. A reaction vessel assembly comprising an elongated walled hollow vessel having inlet and outlet means, an array of girdles, each girdle encircling said vessel and being disposed substantially perpendicularly with respect to the longitudinal axis of the vessel, each of said girdles having an array of support brackets extending outwardly therefrom, the brackets on each array of brackets being radially aligned with the brackets on the other arrays of brackets, an array of supporting columns, said columns being fixedly vertically disposed and generally aligned with respect to the longitudinal axis of said vessel, said columns being equal in number to the number of brackets on each of said girdles, each of said columns having a vertically disposed array of support elements facing said vessel, each of said support elements being disposed in a predetermined spatial relationship with one of said support brackets, and a plurality of arrays of generally vertically disposed springs, one spring of each array being operatively engaged with each of the support brackets and support elements which are disposed in a predetermined spatial relationship with respect to each other.

2. An assembly in accordance with claim 1, wherein each of said vertically disposed springs are supported on one of said support elements, the spring supporting one of said support brackets.

3. An assembly in accordance with claim 1, wherein said vessel is made of metal and said girdles are strap-like elements which are welded to said metal walls of the vessel.

4. An assembly in accordance with claim 1, wherein said assembly has a plurality of arrays of horizontally disposed springs, one of the springs of each array being operatively engaged between one of said supporting columns and one of said support brackets.

5. An assembly in accordance with claim 1, wherein each of said brackets and said support elements present a flat surface to the vertically disposed spring with which it is operatively engaged.

6. An assembly in accordance with claim 1, wherein said supporting columns are H beams.

7. An assembly in accordance with claim 1, wherein said vessel has cylindrically shaped side walls.

References Cited in the file of this patent
UNITED STATES PATENTS

| | | |
|---|---|---|
| 1,591,940 | Joyce | July 6, 1926 |
| 1,766,597 | Bushnell | June 24, 1930 |
| 2,394,853 | Goddard | Feb. 12, 1946 |